United States Patent [19]  [11] 4,135,562
Martineau et al.  [45] Jan. 23, 1979

[54] ARRANGEMENT FOR FILLING AND VENTING A FUEL TANK, OF AN AUTOMOBILE IN PARTICULAR

[75] Inventors: Philippe Martineau, Nantes; Serge Lallement, La Chapelle sur Erdre, both of France

[73] Assignee: Regie Nationale des Usines Renault, Boulogne-Billancourt, France

[21] Appl. No.: 795,937

[22] Filed: May 11, 1977

[30] Foreign Application Priority Data

May 11, 1976 [FR] France .................. 76 14034

[51] Int. Cl.² ............... B65B 3/04; B65D 39/02
[52] U.S. Cl. ........................ 141/285; 141/349; 220/86 R; 251/149.2
[58] Field of Search ........... 137/587; 141/114, 285, 141/301, 311 R, 313, 325, 326, 348, 349, 392; 220/86 R, 288; 251/149.2

[56] References Cited

U.S. PATENT DOCUMENTS 3,477,610 11/1969 Hansen ............... 222/286.5 X
3,897,810 8/1975 Arnett et al. ............ 141/349 X Primary Examiner—Richard E. Aegerter
Assistant Examiner—Frederick R. Schmidt
Attorney, Agent, or Firm—Oblon, Fisher, Spivak, McClelland & Maier

[57] ABSTRACT

An arrangement for filling and venting a safety fuel tank of the type characterized by two elastomer sheets joined at their peripheries, for use in automobiles, wherein a venting tube is disposed in the upper region of the tank with one of its ends inserted in a spout situated at the top of the tank where gases tend to accumulate and the other end opening into the upper part of the filler pipe of the tank just below an auto-blocking valve having an orifice therein for receiving a pump nozzle for filling the tank, and wherein a movable plate is provided for normally blocking the valve orifice.

2 Claims, 15 Drawing Figures

ARRANGEMENT FOR FILLING AND VENTING A FUEL TANK, OF AN AUTOMOBILE IN PARTICULAR

The present invention, relates generally to an arrangement for filling and venting a fuel tank of an automobile and, in particular, to and arrangement which is more especially applicable to flexible safety tanks consisting essentially of two elastomer shells joined at their periphery.

DESCRIPTION OF THE PRIOR ART

This type of safety tank, which has the particular advantage of being able to deform during a collision, also can vary in volume according to the amount of fuel it contains. As fuel is consumed, the two sheets of elastomer constituting the tank move in towards one another so that, upon refilling the tank, the simultaneous introduction of air is avoided or eventually compensated, the explosive mixture of fuel vapor in air being prevented, which is an additional safety guarantee.

SUMMARY OF INVENTION

The object of the present invention is precisely to avoid the formation of this gaseous phase by means of an arrangement for filling a flexible tank while permitting simultaneous venting thereof. It is actually very difficult to avoid introducing air during this operation because of the presence of air bubbles in the fuel stream and the air contained in the pump nozzle.

BRIEF DESCRIPTION OF THE DRAWINGS

Various other objects, features and attendant advantages of the present invention will be more readily appreciated as the same becomes better understood from the following detailed description, when considered in connection with the accompanying drawings, in which.

DETAILED DESCRIPTION OF THE ILLUSTRATED EMBODIMENT

Figure 1:
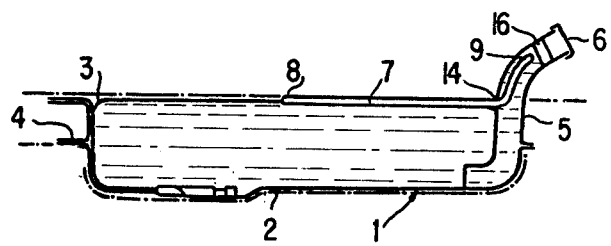
FIG. 1 is an overall view of the tank and an arrangement for filling and venting thereof, according to the present invention.
Figure 2:
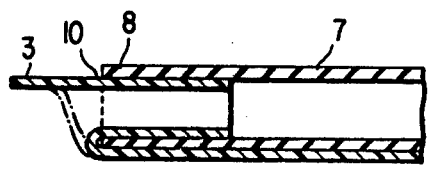
FIGS. 2, 3 and 4 show, respectively, detailed cross sections along an axis of the tank passing through the vent tube thereof, along a transverse axis and from above, showing the junction between the vent tube and the tank, as a first embodiment of the invention.

FIG. 1, the tank, designated by the reference numeral 1, consists of two sheets of elastomer 2 and 3 joined at their periphery 4, being completely filled with fuel to the exclusion of any gaseous phase. As has been indicated above, the shape of the tank depends on how full it is, the shape being variable and the sides 2 and 3 being able to move in towards one another as fuel is consumed until they meet, but always in the absence of any gaseous phase.

A filler pipe 5, closed at its upper end by a gas cap 6, extends downward to the bottom of the tank. A vent tube 7 communicates at one of its ends 8 with an upper region of the tank, where gaseous components tend to accumulate, and at its other end with a region near the top of the filler pipe 5.

Figure 3:
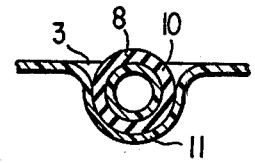
Figure 4:
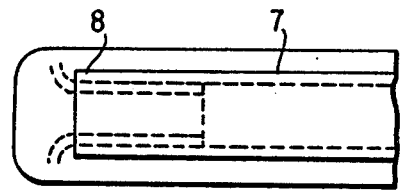

FIGS. 2 to 5 show the junction of the tank and the end 8 of the vent tube. It is seen from FIGS. 2 and 4 that, in a first embodiment of the invention, a spout 10 situated in the plane of the top of the tank is inserted into the end 8 of the vent tube 7, the latter conforming as well as it can to the contour of the elastic envelope constituting the tank 1. To do this, the end 8 of the vent tube 7 extends across the tank in a groove 11 provided in the tank for this purpose (FIG. 3). In another method of fabrication, the union of the vent tube 7 and the top 3 of the elastomer tank can be obtained by simultaneous molding which, because of the resulting homogenity, offers greater safety in case of a collision.

Figure 5:
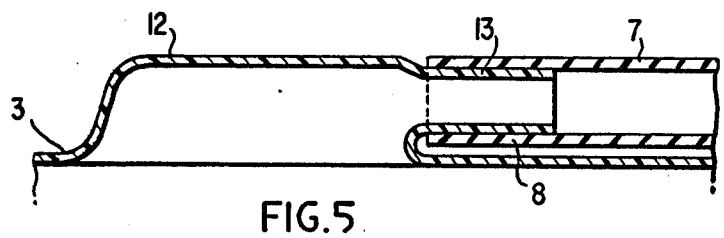
FIG. 5 is a section along the axis of the tank passing through the vent tube, showing the junction of the latter and the tank for a modification of the invention.
Figure 7:
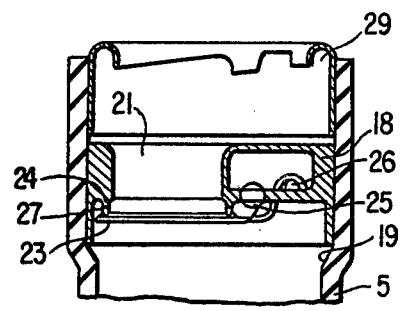
FIG. 7 is a partial lateral section of an auto-blocking valve in the filler pipe; according to this invention

In a modification of the invention, the top 3 of the tank exhibits a protuberance 12, with a spout 13 inserted into the end 8 of the vent tube 7 (FIG. 5). In this case, the tank top 3 does not generally have the groove 11 along the path of tube 7.

In all these configurations, the desire is to stick the end 8 of the vent tube 7 at the highest point of the tank in order to eliminate any possible gas pocket.

However, it is also necessary that the portion of tube 7 extending along the tank top 3 remain horizontal and, in any case, that it not slant downwards in the direction of the filler pipe. Otherwise fuel could accumulate in the bend of tube 7 at 14 and block the path for venting gases from the tank.

Moreover, the dimensions of tube 7, which must not oppose the complete deformation of the tank when empty, must however permit the rapid and complete venting of gas without too much pressure drop. The geometric parameters are determined experimentally in each case.

Figure 6:
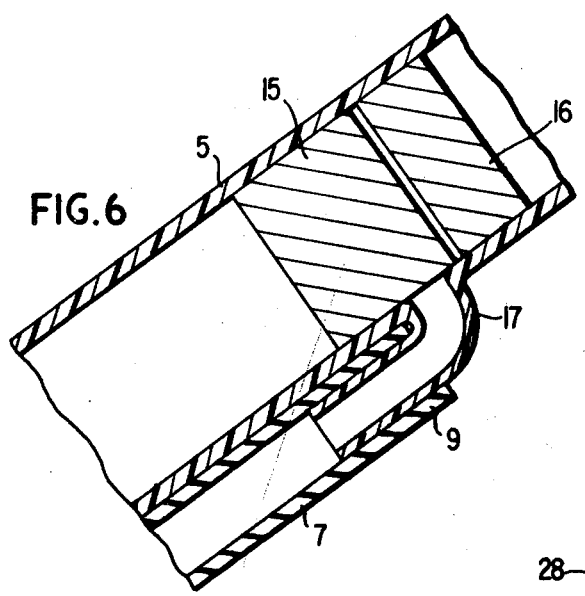
FIG. 6 is a section along the longitudinal axis of the filler pipe passing through the vent tube, showing the junction therebetween.
Figure 8:
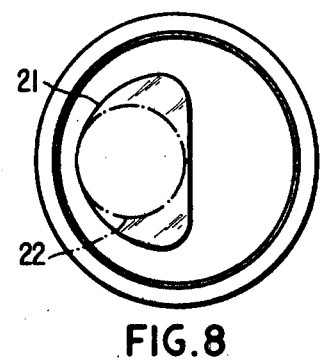
FIG. 8 is a horizontal section through the pipe at the valve.
Figure 9:
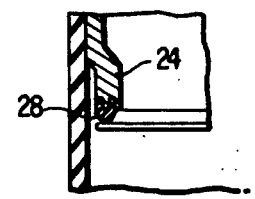
FIG. 9 is a detailed section of the seal at the valve, according to another embodiment of the invention.

FIG. 6 shows the junction of the other end 9 of the vent tube 7 with the filler pipe 5, where a spout 17 on the periphery of filler pipe 5 is inserted into the end 9 of the vent tube just below an auto-blocking valve 16, which will be described below, but above the highest fuel level 15.

The auto-blocking valve 16 (FIGS. 7 to 10) consists of a rigid metal, plastic or rubber shell 18 placed in a specially enlarged section 19 of the pipe 5.

The valve 16 has an orifice 21 of roughly triangular shape, large enough to admit the end 22 of a pump nozzle and serving to guide the same while leaving a certain area free (indicated by shading in FIG. 8) approximately of the same cross section area as tube 7, which permits the venting of gases during the filling operation.

The blocking of the orifice 21 is effected by means of a plate 23, movable about a horizontal axis 26 and pressed against a seat 24 on the bottom of the shell 18, following the contour of the orifice 21, by means of a torsion spring 25.

Sealing between the seat 24 on the shell 18 and the movable plate 23 can be assured by an elastomer disk 27 on the surface of the plate 23, or by a similar lip 28 around the seat 24 (FIG. 9), or by the combination of these two means.

Figure 10A:
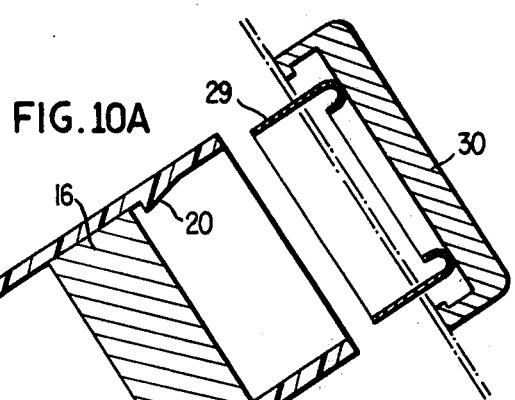
FIGS. 10A and 10B show a lateral section and a detail view of the filler pipe in the region of the gas cap.
Figure 10B:
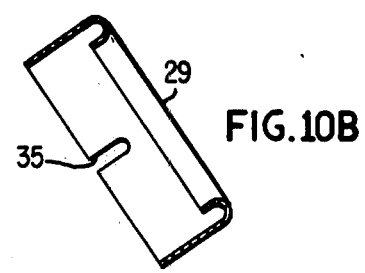
Figure 11:
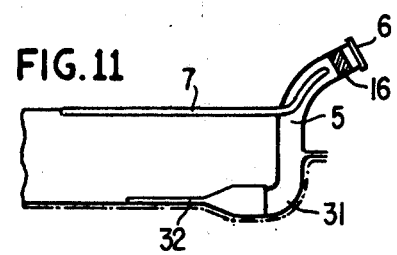
FIG. 11 shows a further embodiment of the invention, using a valve at the bottom of the filler pipe.
Figure 13:
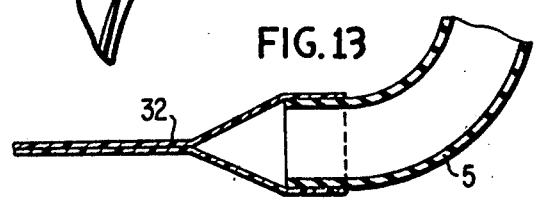
FIGS. 13 and 14 give enlarged sections, lateral and plan respectively, of the valve at the base of the filler pipe.
Figure 14:
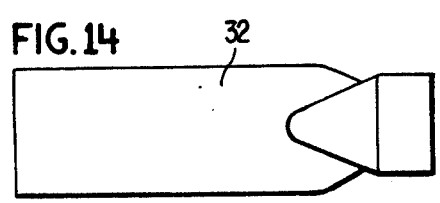

In the top of the pipe 5, above the valve 16, there is a rigid sleeve 29 to which a gas cap 30 fastens (see the detailed FIGS. 10A and 10B).

The sleeve 29 is kept from rotating, when twisting on the gas cap, by means of a lug 20 molded into the pipe 5, which engages a notch 35 in the sleeve 29, but it is to be noted that this arrangement permits the latter to be detached from the pipe 5 by an outward directed force, e.g. during a collision.

In this case both the gas cap 30 and the sleeve 29 come away from the pipe 5, but this remains closed because of the valve 16 which prevents the spilling of any fuel, whatever the position of the vehicle.

On the contrary, when the valve 16 is opened by introduction of the pump nozzle 22 in the course of filling the tank, exchanges are possible between the exterior and interior of the tank, which in particular permit the venting of gas pockets which might form during this operation.

It should be noted that the auto-blocking valve 16 serves at once for the vent tube 7 and that its position near the top of the pipe 5 permits a complete sealing of the entire volume, including that of the liquid contained in the pipe.

Along with this type of valve and the flexible tank, one may use a sealing gas cap. When the fuel level in the tank drops, the underpressure thus produced (since the cap does not allow the outside air to get in) causes the deformation of the tank which tends toward zero volume and thus its original form. The elastomer pipe collapses slightly at the same time, but no gases get into any of the mentioned volumes and, consequently, the formation of explosive gas mixtures is avoided.

Further, the use of a sealing gas cap also prevents the escape of fuel vapors and therefore saves fuel.

FIGS. 11 to 14 have to do with a modification in which the safety of the present arrangement is increased further by doubling the effectiveness of the valve 16 through the use of a second auto-blocking valve of the "duckbill" type at the base of the pipe 5.

The filler pipe 5 consists of a relatively rigid elastomer tube in the shape of an "S", the lower bend of which is in a zone 31 of underpressure with respect to the bottom of the tank.

The pipe is prolonged by a flexible element 32 consisting of a flattened tube preventing the return flow of fuel into pipe 5 under back pressure. Not having to be bent, this element lies flat on the bottom of the tank.

Figure 12:
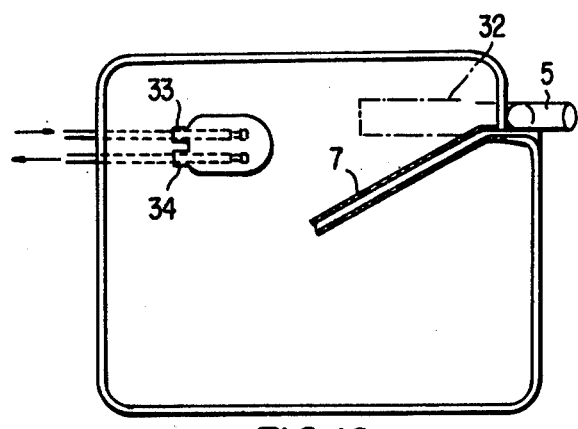
FIG. 12 is a plan view of this variant.

FIG. 12 indicates the presence also of a second zone 32 of underpressure with respect to the base of the tank and into which open the ends of two tubes 33,34. One of these tubes is for supplying fuel to the carburetor and the other is for the return to the tank of surplus fuel representing the output of the fuel pump in excess of the capacity of the carburetor to use it.

Obviously, many modifications and variations of the present invention are possible in light of the above teachings. It is therefore to be understood that within the scope of the appended claims, the present invention may be practiced otherwise than as specifically described herein.

We claim:

1. In a flexible safety fuel tank, particularly for use in automobiles, having two elastomer sheets joined at the periphery of each sheet, a filler pipe by which fuel is directed into said tank, one end of said filler pipe disposed in the interior of said tank and the other end of said filler pipe disposed exterior to said tank, and a gas cap mounted on said other end of said filler pipe, the improvement comprising:

a venting tube communicating between the interior of said tank and said filler pipe, said venting tube having one end situated at the top of the tank where gases tend to accumulate and another end opening into an upper part of the filler pipe located in the vicinity of said other end of said filler pipe; and, an auto-blocking valve disposed in said other end of said filler pipe just above said other end of said venting tube wherein said gas cap is manually mounted on said other end of said filler pipe by means of a twisting action, further comprising: said filler pipe having a lug integrally molded therein at a point above said auto-blocking valve; and, a rigid sleeve disposed in said upper part of said filler pipe immediately above said auto-blocking valve and in proximity with said gas cap, said sleeve serving as a base for twisting engagement with said gas cap, said sleeve having a slot in the periphery thereof for engaging said lug in said filler pipe and thereby preventing rotation of said sleeve when said sleeve is twistingly engaged by said gas cap, said slot disposed on the side of said sleeve adjacent said auto-blocking valve parallel to the axis of said filler pipe such that any externally applied force exerted on said gas cap outwardly from said filler pipe can pull the sleeve therefrom, without impairment of the auto-blocking valve.

2. A flexible safety tank according to claim 1 which is filled by means of a pump nozzle connecting a fuel source to said filler pipe, wherein said auto-blocking valve comprises:

a shell of rigid material inserted in the upper part of said filler pipe, between said another end of said vent tube and said other end of said filler pipe, said shell pierced by an orifice having a cross-sectional area equal to or larger than the combined cross-sectional areas of said pump nozzle and said vent tube, said shell having a seat circumscribing said orifice;

a plate movable about a horizontal axis and pressed against the seat of said shell; and, a spring connected to said shell and said plate for holding said plate pressed against said seat.

* * * * *